United States Patent
Wiley

[15] 3,673,070
[45] June 27, 1972

[54] PROCESS FOR REMOVING AND CONCENTRATING ACIDIC ORGANIC MATERIAL FROM WATER

[72] Inventor: Robert A. Wiley, Houston, Tex.
[73] Assignee: Petrolite Corporation, St. Louis, Mo.
[22] Filed: June 22, 1970
[21] Appl. No.: 48,367

[52] U.S. Cl..............................204/186, 204/188, 208/263, 208/284
[51] Int. Cl..................B03c 5/00, C10g 17/00, C10g 31/14
[58] Field of Search..............204/186; 208/88, 97, 263, 284, 208/321; 210/21, 59; 260/609 C, 627

[56] References Cited

UNITED STATES PATENTS

| | | | |
|---|---|---|---|
| 3,342,720 | 9/1967 | Turner | 204/302 |
| 3,216,927 | 11/1965 | Dresser | 208/284 |
| 2,868,722 | 1/1959 | Brooks et al. | 208/263 |
| 2,872,408 | 2/1959 | Waterman et al. | 204/302 |
| 1,832,140 | 11/1931 | Shaw | 260/627 R |
| 1,873,900 | 8/1932 | Miller | 260/627 R |
| 2,110,412 | 3/1938 | Yabroff et al. | 260/609 C |
| 2,270,491 | 1/1942 | Yabroff et al. | 260/609 C |
| 2,928,882 | 3/1960 | Hall | 260/627 R |
| 3,193,484 | 7/1965 | Gleim et al. | 204/186 |

Primary Examiner—John H. Mack
Assistant Examiner—Neil A. Kaplan
Attorney—Emil J. Bednar and Sidney B. Ring

[57] ABSTRACT

A process for removing and concentrating acidic organic material from a water stream. The water stream is dispersed within an organic liquid solvent for removing substantial amounts of acidic organic material, such as phenol, mercaptans and thiophenols etc., from the water. The enriched organic solvent phase is separated from the purified water stream phase. Next, the enriched solvent is intimately contacted with substantially stoichiometric amounts of an immiscible concentrated caustic solution forming a three phase mixture in a second dispersion. This three phase liquid mixture is separated into a regenerated solvent phase, a second liquid phase of the alkali-metal salts of extracted acidic organic material, and a third phase of excess caustic solution. Preferably, both phase separations are undertaken in the presence of an electric field.

The regenerated solvent is recycled into contact with the water stream; the high-purity alkali-metal salts of extracted acidic organic material are passed to some suitable utilization, and the excess caustic solution is recycled for regenerating further amounts of the enriched solvent. Only small amounts of caustic need to be added to maintain a circulating inventory of the caustic solution.

16 Claims, 1 Drawing Figure

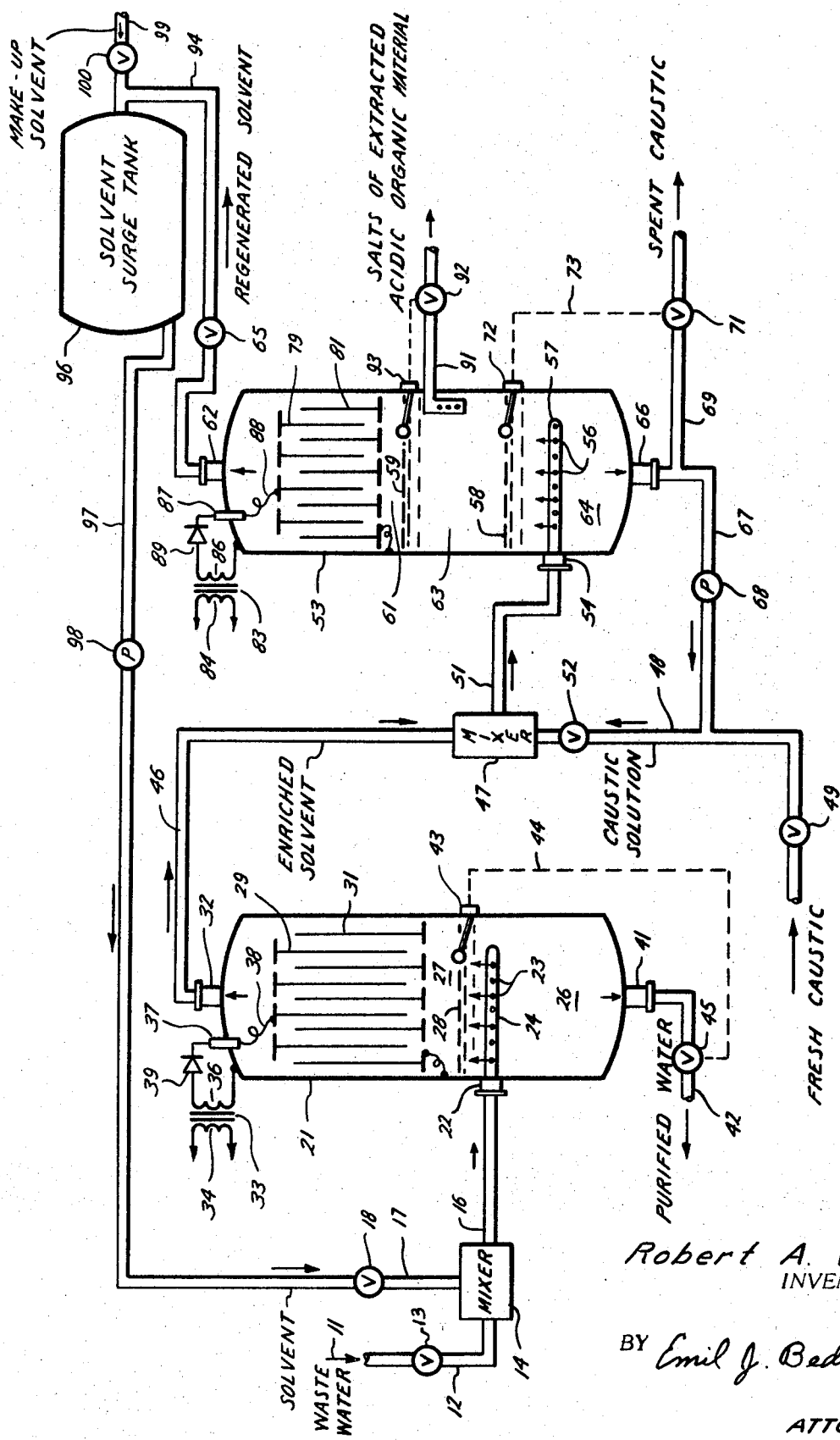

PROCESS FOR REMOVING AND CONCENTRATING ACIDIC ORGANIC MATERIAL FROM WATER

BACKGROUND OF THE INVENTION

1. Field of the Invention

This invention relates to the purification of water and the recovery of acidic organic material. More particularly, it relates to the efficient removal of acidic organic material from waste water and the conjunctive recovery of the acidic organic material in a relatively pure form in a closed cycle operation.

2. Description of the Prior Art

There are in our industrial environment many water streams contaminated by acidic organic material such as phenols, mercaptans, thiophenols and other acidic organic materials. These acidic materials prevent a re-use of the water for municipal purposes or even to permit its discharge into natural waters such as rivers or bays. The acidic organic material has a relatively high commercial value in a relatively pure and concentrated form. Many processes were proposed in the past for purifying waste water with recovery of contaminating acidic organic material.

Waste liquor from amonia stills associated with coking ovens could not be disposed in rivers or other bodies of waters because of large amounts of phenols carried in solution in the waste water phase. One method removed these phenols with light oils rich in aromatics being the solvent to extract the phenols from water. However, the high-volatility of the light aromatics (benzene and toluene) produced large losses of the solvent by evaporation and solubility in the water phase. In order to rectify this difficulty, it was proposed in closed cycle operation to intimately contact the waste liquor with a relatively heavy neutral oil having a significant aromatic content whose high boiling characteristics prevented the loss of the solvent by evaporation or solution. The neutral oil efficiently extracted the phenols from the waste water. Further, this two phase mixture separated in time into a purified water stream phase and an enriched neutral oil phase. The neutral oil phase after being separated from the water phase was washed with a dilute caustic solution (below 24 percent by weight of caustic) to produce a regenerated neutral oil solvent (re-used to extract phenols from water) and the sodium salts of the extracted phenols dissolved in the dilute caustic solution. The phenols could be recovered from the corresponding salts in the caustic solution by neutralization. As a result, the raw phenol product was saturated with water. Moreover, neutralization created a severe problem in the disposal (or regeneration) of relatively large amounts of the spent dilute caustic solution. The regeneration of dilute caustic solutions is relatively expensive. The purification of the raw phenol product also increases production costs. Thus, this method was not entirely acceptable to the industry.

Many solvents were well known for many decades for extracting phenols from water. In addition to the neutral oils previously mentioned, various types of petroleum derivatives, such as lubricating oil stocks, distillates of either virgin or cracked origin, were available in counter-current extraction operations to recover the phenols from water. For example, the phenol extraction of the lubricating oil stock has been used for three decades in commercial processes to produce a relatively aromatic-free high quality lubricant. Steam stripping of the extracts and raffinates of the lubricating oil processes resulted in amounts of phenol appearing in the condensate of the stripping steam. The phenol was recovered in a closed cycle operation from this steam condensate by a counter-current extraction with the incoming lubricating oil stock.

Various other procedures have been proposed to be employed in conjunction with conventional refining operations for removing phenol from waste waters. Phenolic waste water produced in steam stripping of catalytic cracking operations was used as the salt extractant in a crude oil desalter. In the desalter, the phenols passed into the crude oil phase and a relatively phenol-free but salt-laden waste water phase separated from the crude oil could be readily disposed without objectionable phenol content. The phenols in the crude oil were recovered in a subsequent processing step contemporaneously with phenols generated in the refining procecures.

Another similar refining procedure was proposed for removing phenols from a stripping-steam condensate in a non-recirculating solvent system. Conventional catalytic cracking of gas-oil produces various more valuable products. However, large amounts of phenols are produced in the cracking operation. The products from the catalytic cracking are steam stripped to produce a gasoline fraction, a light cycle oil and a heavy cycle oil. The gasoline and light cycle oil streams in the conventional catalytic cracking process pass through separate caustic scrubbers which remove the residual phenols from these streams. The caustic from these scrubbers is relatively dilute (below 24 percent by weight of caustic) and is combined for regeneration or disposal. In this particular procedure, the phenol-laden steam condensate is counter-currently washed with the light cycle oil before treatment in its caustic scrubber to produce a relatively phenol-free water. Thus, a large amount of dilute caustic containing phenolates is produced. Either neutralization or expensive stripping-fractionation and regeneration steps are required for the recovery of raw phenols and a reuseable or disposable caustic solution. Unfortunately, the light cycle oil not only extracts phenols from the steam condensate but also dissolves non-acidic organic materials, such as color degrading and gum forming bodies, produced in the catalytic cracking process and collected in the steam condensate. These deleterious bodies pass unaltered through the caustic scrubber in solution in the light cycle oil. The light cycle oil is utilized primarily as furnace and heating oils. The color bodies degredate in time so that a given color standard can not be maintained. The gum bodies polymerize on storage to produce resinous materials that clog filters, screens and like devices on the inlets of pumps moving the heating oil into furnaces. Thus, using an available solvent stream to remove phenols from water causes unacceptable product degradation of the heating oils.

The above mentioned problems in refinery processes might be avoided by using a closed cycle system wherein a captive solvent is employed for extracting acidic organic materials from the waste waters. However, the problem of having to recover these materials from large volumes of dilute caustic solution, and to regenerate or rebuild this caustic solution to a suitable strength and costs for regenerating the solvent has prevented a ready application of such procedures. The present invention is directed to a process for removing and concentrating acidic organic materials from a waste water stream in a closed cycle system which avoids substantially all of the problems of the procedures heretofore described.

SUMMARY OF THE INVENTION

The present invention is a process for removing and concentrating acidic organic material from a water stream. The water stream is intimately contacted with an immiscible organic solvent whereby the solvent removes substantial amounts of acidic organic material from the water stream. The enriched organic liquid solvent phase is separated from the purified water stream phase. Then, the enriched organic liquid solvent is intimately contacted with substantially stoichiometric amounts of an immiscible concentrated alkali-metal hydroxide aqueous solution. This solution contains sufficient amounts of the alkali-metal hydroxide so that a three phase mixture is formed of a regenerated organic liquid solvent substantially free of acidic organic material, alkali-metal salts of extracted acidic organic material, and only a small residue of the concentrated alkali-metal hydroxide solution. The mixture is separated into a first phase of the regenerated organic liquid solvent, a second phase of the alkali-metal salts of extracted acidic organic material, and a third phase of excess alkali-metal hydroxide solution. In a preferred embodiment of this invention, the separations of the various phases are made in the presence of an electric field which greatly increases the efficiency of this process.

BRIEF DESCRIPTION OF THE DRAWING

The drawing is a schematic flow diagram of an apparatus for performing the various steps of the process of the present invention.

DESCRIPTION OF SPECIFIC EMBODIMENTS

Referring to the drawing, there is illustrated in an apparatus by which the steps of the present process may be practiced. However, it is to be understood that the present process may be practiced in other apparatus as will be apparent from the present description.

A supply of waste water to be purified by the present process may be from any source such as a sour phenolic steam condensate from an oil refinery. A water stream 11 is moved through a conduit 12 containing a control valve 13 into a suitable apparatus for intimately contacting the waste water with an organic liquid solvent. Preferably, the intimate contacting function is provided by a mixer 14.

The water stream 11 (commonly denoted as waste water) contains acidic organic material which is to be removed to produce a purified water stream for ready disposal in a natural water such as rivers, reservoirs, and the like. However, the purified water stream may be sent to other utilizations. The term acidic organic material, as it is used in this present description, is intended to include any acidic organic material which can be either suspended, dissolved or otherwise carried in a water stream. Also, this acidic organic material is soluble in organic liquid solvents from which it can be extracted with alkali-metal hydroxide aqueous solutions to form resultant salts soluble in an excess of the alkali-metal hydroxide solution. The acidic organic material more specifically is intended to include phenolic material such as phenol, cresols, xylenols, and the various heavy alkylated phenols within the boiling range of about 380° F. to about 500° F. In addition, the acidic organic material includes other types of acidic organic material such as thiophenols, mercaptans, organic carboxcyclic acids separately and in combinations to form various organic compounds containing an acidic hydrogen reactable with strong alkali-metal hydroxide aqueous solutions to form corresponding salts. Other distinguishing characteristics of the materials encompassed within the terminology acidic organic material, for purposes of this invention, will become more apparent from the present description.

The waste water usually is produced from processes which involve a cracking operation, either catalytic, thermal or otherwise, of naturally occurring or synthetic organic products such as coal, crude oil and the like. The waste water is more commonly generated by the use of steam for stripping and separating various catalytic products from one another. Additionally, other sources of the waste water are in the use of phenol extraction processes for purifying lubricating oil stocks and the like. Whatever the source of the waste water, it is envisioned that it will contain amounts of the acidic organic material such that it can not be utilized without purification.

In the mixer 14, the water stream 11 is intimately contacted with an organic liquid solvent capable of removing substantial amounts of the acidic organic material from the water phase. The organic liquid solvent is preferably a petroleum derivative whose initial boiling point is sufficiently high that it contains small amounts of light aromatics, such as benzene and toluene so that insignificant amounts of the solvent can dissolve into the waste water. In addition, the solvent will usually have a boiling point below about 800° F. in order that the resultant viscosity of the solvent is sufficiently low so as not to create any undue mixing difficulties or inverted emulsion problems with water as the continuous phase. The viscosity of the solvent depends to a great extent upon the temperature of the fluids being intimately contacted within the mixer 14. The organic liquid solvent will be referred to as the solvent in the remaining description of the present process.

The solvent may be a petroleum derivative as kerosene, light gas oils, aromatic solvent cuts, lubricating oil stocks, light cycle oil and the like. Preferably, the solvent has a sufficient aromatic content that relatively large quantities of the acidic organic material may be dissolved in relatively small amounts of the solvent. For this purpose, the aromatic content should be above about 20 percent by volume. However, other organic materials in addition to petroleum derivatives may be employed. These will include chlorinated hydrocarbons such as chlorethane, ethylene dichloride, trichloroethylene, and various other related halogenated organic compounds. In addition, nitrogen-based solvents such as pyridene and nitrogenous petroleum products may also be employed. Mixtures of these various organic materials may be used for the solvent. The solvent, at the temperature at which a phase separation ultimately is desired from the waste water, must have a sufficient difference in its specific gravity relative to the water phase at separation conditions that a separation of the phases may be obtained under the influence of gravity. However, a difference in specific gravities of only a few tenths between the phases will be sufficient to permit efficient separation for the purpose of the present invention. Preferably, the solvent is less dense than water and forms the upper layer upon phase separation.

The mixer 14 may take any suitable form such as pressure-loaded mixing valves, centrifugal pump-type mixers, various types of orifice and particle packed towers, Raschig rings, and other types of tower packing materials. The mixer 14 must intimately contact the water and solvent. The intimate contacting between the waste water and solvent in the mixer 14 may be by cocurrent flows. However, contacting by counter-current flows with a combining of the two effluents in outlet 16 of the mixer 14 is preferable for maximum extraction efficiency of the acidic organic material by the solvent. Preferably the mixing of the solvent and water phases takes place at ambient temperatures. However, it may take place from ambient temperature to some elevated temperature, such as 250° F., providing the mixer 14 is operated at a sufficient backpressure to maintain all constituents substantially within their liquid phases.

The solvent is introduced into the mixer 14 through an inlet 17 with fluid flow controlled by a valve 18. The valves 13 and 18 control amounts of the two phases entering the mixer 14. Sufficient backpressure in the outlet conduit 16 is maintained upon the fluids in the mixer 14 to preserve substantially liquid phase conditions during mixing. The intimate contacting conditions within the mixer 14 by selection of proper shear and mixing energy characteristics finely distribute the water stream within the organic liquid solvent to form a dispersion. Preferably, the water stream is dispersed as very fine droplets throughout the continuous organic solvent phase with smaller particle sizes in the micron range, usually above about 15 microns in size. These dispersions will settle under the influence of gravity with time with only a few tenths difference in specific gravities of the solvent and water phases. For example, lubricating oil stock, as the solvent, and water can be dispersed thereinto to such fineness in droplet sizes that the extraction of acidic organic material is nearly complete. However, the resulting dispersion at ambient temperature will resolve itself into two separate phases in approximately one hour solely under the influence of gravity. The use of a less dense solvent, such as light cycle oil produced in catalytic cracking of distillates in oil refineries, produces similar dispersions that separate substantially completely into two separate phases at ambient temperature within approximately 45 minutes solely under the influence of gravity. Whatever solvent is employed, it must have a slightly different specific gravity from water at the separation condition, especially temperature. The intimate contacting in the dispersion of the waste water within the solvent should result in removal of more than 90 percent by volume of the acidic organic material from the water stream.

The volumetric ratios of the waste water and solvent which are introduced into the mixer 14 depend upon the solvents quantitative ability to extract the acidic organic material from the water stream and the desired percentage removal of such acidic organic material. For example, the waste water stream may contain only small amounts of the acidic organic material, for example about 200 ppm. Therefore, a relatively small volumetric amount of solvent is required for each water volume when the mixer 14 produces a very intimate contacting of the water stream with the solvent. Where the waste water contains large amounts of the acidic organic material, the same solvent should be used in larger amounts to obtain the same percentage removal of the acidic organic material and produce an identical purified water. For example, the ratio between the solvent and waste water introduced into the mixer 14 may vary from about a 1:1 to about a 1:10 volume amounts. Usually, the ratio between the solvent and water is in the range of between about 1:3 and about 1:5 volumes. However, the particular volumetric ratio is uncritical as long as the desired percentage removal of the acidic organic material is obtained from the waste water. It will be appreciated that the operation of the mixer 14 is coordinated with the particular solvent to be used. A highly aromatic solvent is capable of removing (on equal volume basis) a substantially larger amount of the acidic organic material than a naphthenic or paraffinic solvent. Thus, a highly aromatic solvent allows the mixer 14 to produce a lesser intimate contacting of the water stream with the solvent than where a solvent such as lubricating oil stock is to be mixed with the waste water. Adjustment of the volumetric ratios between the waste water and solvent are required but they may be readily correlated with the extraction efficiency of the solvent and the operation of the mixer 14 according to solvent extraction practices well known in the arts.

The separation of the dispersion of the water stream within the solvent may take place in any suitable apparatus that produces an enriched solvent phase and a purified water stream phase. It is preferred that the separation of solvent and water phases take place under the influence of an electric field. The electric field produces a highly efficient separation of the two phase mixture in time periods of less than about a minute as compared with the conventional gravitational separation requiring periods of nearly an hour. In addition, the electric field produces a greater purity in the respective phases than can be obtained solely with gravitational separation in a reasonable time period.

In a preferred embodiment of the present invention, the two phase mixture from the outlet 16 is passed into an electric treater 21. The electric treater may be of any suitable form of which many designs are well known to those skilled in the art capable of producing a fast and efficient separation between the two immiscible phases under the influence of an electric field. The electric treater is preferably constructed in a form where the dispersion flows under substantially uniform conditions within the electric field. An electric treater with the structure described in U. S. Pat. No. 3,342,720, provides optimum phase separation for the dispersions produced by the mixer 14. The electric treater produces an enriched solvent phase containing small amounts of residual purified water stream phase usually 0.005 percent by volume or less. The purified water stream phase contains only small amounts of the residual enriched solvent phase in amounts of 0.01 percent by volume or less.

The dispersion in the conduit 16 passes into inlet 22 of the electric treater 21, through the openings 23 in a distributor 24 and into a body 26 of water. The less dense dispersion then passes upwardly into an electric field established within a body 27 of the solvent after having traversed the solvent-water interface 28. An electric field within the solvent body 27 is provided by an energized electrode 29 and a grounded electrode 31. The metal shell of the electric treater 21 also serves as a grounded electrode. The electrodes 29 and 31 may be of any suitable construction but are usually of a cellular design so that the solvent may pass freely upwardly in elongated cells through the electric field before passing from the treater 21 through an outlet 32. The electrode 29 is energized by connection to a suitable source of electrical power. The power source may be a transformer 33 having a primary 34 connected to an a.c. power supply and a secondary 36 connected at one terminal through an entrance bushing 37 with a connecting lead 38 to the electrode 29. The other terminal of the secondary 36 is connected to the grounded electrode 31 directly or through a common ground connection through the metal shell of the electric treater 21.

Preferably, the electrode 29 is energized with a high d.c. potential which may be provided by placing a rectifier 39 in series with the secondary 36 terminal connection to the bushing 37. The d.c. potential energizing the electrode 39 produces the highly efficient separation of the enriched solvent phase from the purified water phase within the treater 21. For example, the electrode 29 may be energized to d.c. potentials between 15 and 50 kilovolts. Usually, the energizing potential is in the range of about 30,000 volts d.c. A spacing between the energized electrode 29 and the grounded electrode 31 may be between 3 and 10 inches but usually is in the range of approximately 3 inches. An electric field of this intensity in the solvent body 27 substantially immediately coalesces the dispersion flowing upwardly through the interface 28. Coalescence produces an enriched solvent phase of relatively high purity which is removed through the outlet 32. The enriched solvent phase carries the extracted acidic organic material. The purified water phase collected in the body 26 of water has a high purity except in the region in which the less dense dispersion is passing upwardly therethrough. The body 26 of water has a substantial volume in the lower portion of the treater 21 below distributor 24 allowing an additional gravitational settling zone. Under such conditions, the purified water stream is removed through the outlet 41, passed through a conduit 42 having a control valve 45 to a suitable utilization. The purified water contains only very small amounts of residual acidic organic material.

Proper adjustment of the solvent and waste water volumes in the mixer 14 and optimum phase separation within the electric treater 21 can be expected to produce above a 90 percent removal of phenols and other types of acidic materials from the waste water. The purified water stream in the conduit 42 may be disposed in municipal reservoirs or discharged into rivers or the like. If desired, the purified water may be returned into the processing system from which it originated.

The interface 28 can be maintained at a constant level in the treater 21 by a float-actuated level controller 43. Preferably, the interface 28 is maintained closely adjacent the distributor 24. However, the drawing shows the interface 28 spaced a substantial distance above the distributor 24 for purposes of illustration. In conventional operational practices, the interface 28 should be maintained adjacent the horizon of the distributor 24. The controller 43 is connected to operate the valve 42 in a conventional fashion as indicated by the dashed line 44.

The solvent can have a higher specific gravity than the water in the treater 21. In this situation, the positions of the bodies 26 and 27 would be inverted. Therefore, the structure of the electric treater would be inverted with the electrodes 29 and 31 residing in the lower solvent phase. Electric treaters designed for such "inverted" phase operation are well known.

The treater 21 operates at some selected temperature but principally depends upon the temperature of the dispersion moving into the inlet 22. Usually, this selected temperature is in the range of from about ambient temperature (75–80° F) to approximately 150° F. Excessive temperatures within the treater 21 are not desired because the amount of water soluble in the enriched solvent phase increases with temperature. For this reason, it is more desirable to operate the treater 21 at temperatures not above 150° F. Preferably this temperature is in the range of between about ambient temperature and 110° F. Whatever temperature is selected, there must be a sufficient differential in specific gravities to allow separation of the enriched solvent and purified water.

The enriched solvent phase passes from the outlet 32 of the treater 21 and moves in conduit 46 to the mixer 47. As the next step, the enriched solvent is intimately contacted in the mixer 47 with an immiscible concentrated alkali metal hydroxide aqueous solution. This caustic solution is introduced into the mixer 47 through the conduit 48 containing a control valve 49. The mixer 47, like the mixer 14, is arranged to provide the shear and mixing energy for a very intimate contacting of the enriched solvent and caustic solution. Preferably, the mixer 47 produces a dispersion of the caustic solution within the enriched solvent phase. The more highly dispersed the caustic solution is within a given volumetric ratio to the enriched solvent, the more highly efficient removal of the acidic organic material from solvent is obtained.

In accordance with the present invention, the caustic solution contains a sufficient amount of the alkali-metal hydroxide so a three phase mixture is formed in the dispersion discharged from the mixer 47 into the outlet conduit 51. This three phase mixer contains regenerated solvent which is substantially free of acidic organic material, the alkali-metal salts of the extracted acidic organic material, and unreacted caustic solution. More particularly, the concentrated caustic solution should contain at least 35 percent by weight of the alkali-metal hydroxide. Preferably, this caustic solution contains between 40 and 50 percent by weight of the alkali-metal hydroxide. Good results are obtained with a caustic solution containing about 45 weight percent of the alkali-metal hydroxide. Although any of the alkali-metal hydroxides may be employed to produce the aqueous solution, it is preferred to employ sodium hydroxide for this purpose. However, sodium hydroxide, potassium hydroxide separately and in mixtures of these two caustic materials, in an aqueous solution may be employed with good results in the present invention. Selection of a particular caustic solution composition depends to a certain extent upon the kind of acidic organic material dissolved in the enriched solvent. If the acidic organic material is phenols, a mixture of sodium and potassium hydroxide in aqueous solution is satisfactory. However, good results can be obtained with either caustic used separately. A relatively simple laboratory test will indicate which caustic solution gives best results.

The exact amount of the caustic solution introduced into the mixer 47 depends upon the acidic organic material content of the enriched solvent. For purposes of the present invention, the amount of the caustic solution should be a substantially stoichiometric amount of the alkali-metal hydroxide in aqueous solution required to form in the three phase mixture only a small residue or excess of the unreacted concentrated caustic solution. Generally, this result requires a slight excess of the caustic solution of the above stoichiometric amount. However, the particular amount of any caustic solution is dependent upon the temperature of the liquids and the degree of intimate contacting of the caustic solution with the enriched solvent. Reference may be taken to U. S. Pat. Nos. 2,110,412, 2,868,722 and 3,216,927 for thorough descriptions of the amount and types of strong caustic solution required to form three phase mixtures by reaction with acidic organic material of the type encountered in the present process.

Usually the amount of strong caustic solution relative to the enriched solvent entering the mixer 47 will be in the range of from 1:20 to about 1:300 volumetric ratio. Good results have been obtained with slightly above about 1:20 volumetric ratio.

The caustic solution and enriched solvent are intimately contacted in the mixer 47 under suitable conditions of temperature that a very efficient extraction of the acidic organic material from the enriched solvent is obtained. Generally, the mixer 47 operates with the liquids at a selected temperature from ambient temperature (75–80° F.) to about 250° F. with good results. Again, the particular temperature depends upon the type of solvent and the acidic organic material which is carried therein into the mixer 47. However, the pressure within the mixer 47 should be of a sufficient magnitude that the fluids are in the liquid phase. In addition, the amounts of the concentrated caustic solution and enriched solvent introduced into the mixer 47 are carefully adjusted with valve 52 before these liquids are intimately contacted together to form the desired dispersion.

The dispersion from the mixer 47 passes through the conduit 51 into a phase separating apparatus that produces a first phase of the regenerated solvent, a second phase of the alkali metal salts of the extracted acidic organic material, and a third phase of excess unspent caustic solution. A gravity separation can be employed in the apparatus in time periods approaching an hour. However, it is preferred that the separation into the three separate phases take place under the influence of an electric field. The electric field in an electric treater 53 can make a highly efficient separation of these phases in a few minutes with each phase being of relatively high purity. The electric treater 53 may be of any construction but preferably is substantially the same as electric treater 21. The dispersion enters the electric treater 53 through an inlet 54 and passes through openings 56 in a distributor 57. Unresolved dispersion passes upwardly through interfaces 58 and 59 to enter an electric field within a body 61 of regenerated solvent in the upper portion of the electric treater 53. The electric field immediately resolves all aqueous materials passing upwardly through the interface 59 and produces as the body 61 a substantially pure regenerated solvent phase which is removed through the outlet 62. Substantially pure alkali metal salts of the extracted acidic organic material collect in a body 63 residing intermediate the interfaces 58 and 59. A body 64 of the excess caustic solution resides below the interface 58. The body 64 is maintained in a sufficient volume within the treater 53 to provide a reservoir for the caustic solution circulated to the mixer 47. For this purpose, the excess caustic solution is removed from the body 64 through an outlet 66 and passes through a conduit 67 and a pump 68 into the conduit 48 and valve 52 before entering the mixer 47.

Thus, the caustic solution may be introduced through the conduit 48, traverse the mixer 47 and pass into the electric treater 53 to establish a desired body 64 of caustic solution beneath the interface 58. Preferably, the caustic solution is removed through the outlet 66 and recirculated to the mixer 47 by the pump 68. Under certain conditions in operation of the treater 53, it may be desired to remove quantities of the caustic solution from the body 64 to maintain a desired level or strength of caustic solution, or for other reasons. For this purpose, a side stream of the caustic solution may be removed from outlet 66 through a conduit 69 at periodic intervals or continuously to a suitable utilization. If desired, the flow through the conduit 69 may be controlled by a valve 71 actuated by float type level controller 72 through an interconnection indicated by dashed-line 73. Under these conditions, fresh caustic solution can be introduced through the conduit 48 to maintain the strength of caustic solution entering the mixer 47 to compensate for any spent caustic solution removed through the conduit 69. Other means of maintaining the strength of the caustic solution may be employed, if desired.

The amounts of caustic solution moved through the conduit 48 depend principally upon two factors. One factor is the salts of extracted acidic organic materials collected within the body 63 within the treater 53 consume the alkali metal hydroxide. Thus, an equivalent amount of fresh caustic solution would need to be introduced into the system to maintain the strength of the caustic solution circulated through the conduit 48 to the mixer 47. A second factor is the operating conditions within the treater 53 which influence the exact amount of fresh caustic solution that needs to be added into the system. For example, elevated temperatures within the treater 53 cause substantial amounts of water to enter the regenerated solvent phase collected in the body 61. Water is produced in the reaction created in the dispersion removed from the mixer 47 in the line 51. As a result, the recirculating caustic solution from the body 64 would be diluted by this amount of water. Therefore, additional amounts of the strong caustic solution must be introduced into the recirculating caustic solution to maintain a desired level of strength. Alternatively or conjunctively, elevating the temperatures of the treater 53 causes significant amounts of water to be placed into solution in the body 61 of regenerated solvent. Obviously, the temperature within the treater 53 compensates to a known extent the amount of fresh caustic solution required to be introduced into the system. As a matter of fact, the temperature within the treater 53 can be employed to remove more than the excess water generated by the reaction occurring in the mixer 47.

The electric treater 53 may be of any suitable construction but it is preferably arranged in an identical fashion to the electric treater 21. More particularly, the electric field within the treater 53 is created between cellular-arranged energized electrode 79 and a grounded electrode 81 by an applied potential from a transformer 83 having a primary 84 connected to a suitable source of a.c. power and a secondary 86 connected through a bushing 87 with a conductor 88 to the electrode 79. Preferably, the electrodes are energized with a d.c. potential which is provided by a rectifier 89 connected into one conductor of the secondary 86. The other conductor of the secondary 86 connects to the grounded electrode 81 and a common connection to the shell of the treater 53.

The treater 53 provides a ready and complete separation between the liquid salts of the extracted acidic organic material which collects in the body 63 and the excess caustic solution collecting in the body 64. The regenerated solvent phase (being much less dense) readily disengages from the bodies 63 and 64 and passes through the interface 59 into the electric field provided by the cellular electrodes 79 and 81. The electric field causes any residual amounts of the salts of extracted organic material to immediately separate and merge into the body 63. As a result, the body 61 of regenerated solvent contains negligible amounts (less than 0.005 percent by volume) of either the salts of extracted organic material or the excess caustic solution. The salts of extracted acidic organic material are in a liquid phase and easily removed from the treater 53 through an outlet 91 controlled by a valve 92 for transfer to a suitable external utilization. The flow through the valve 92 may be controlled by the level controller 93 mounted on the side exterior surface of the treater 53. Preferably, the removal of fluid through outlet 91 is at a uniform rate for maintaining a relative constant volume in the body 63.

The salts of extracted acidic organic material are an extremely valuable product of commerce and readily marketed without any subsequent treatment. Where the acidic organic material in the waste water is phenolic, the salts stream removed through the outlet 91 is termed "sodium cresylate" in the market place. This stream, volume-wise, may be above 60 percent sodium cresylates, 5 percent residual hydrocarbons, 10 percent water and 1 percent caustic. Other types of acidic organic material may be sold as valuable products in commerce for plasticizers, accelerators and like materials for use in various types of chemical reactions. The caustic solution usually contains no solvent and only very small amounts of salts of extracted acidic organic material (e.g., less than 1 percent by volume).

Thus, the operation of the electric treater 53 provides a highly efficient and rapid separation of the mixture from mixer 47 into three phases. It also provides a reservoir for the recycling caustic solution to the mixer 47, and a separate valuable organic salt stream removed to an external utilization through the outlet 91. The regenerated solvent from the outlet 62 passes through a back-pressure valve 65 in conduit 94 into a surge chamber 96 forming a reservoir for the recirculating solvent subsequently used in the mixer 14. For this purpose, a conduit 97 connects the surge tank 96 and pump 98 into the conduit 17 through the control valve 18 which regulates solvent flow into the mixer 14. This closed cycle system for the solvent employed in the present process retains in the solvent any undesired non-acidic organic materials such as color bodies, gum formers and the like. These undesired materials can not contaminate hydrocarbon streams and products in surrounding operational processes. If desired periodically, or on a continual basis, a small amount of the solvent may be diverted out of the closed cycle for reprocessing should the foreign materials approach a concentration which might prevent full utilization of the solvent in the present process. However, chances of such contamination are slight in the present process steps. In the event of loss of the solvent, and for the initial charge, necessary quantities of the solvent may be introduced from the inlet 99 through a control valve 100 into the surge tank 96.

Preferably, the regenerated solvent, liquid salts and excess caustic solution usually have increasing specific gravities in the named order. However, there may be situations where the specific gravities are in a different order. Under these conditions, the electric treater 53 is arranged to provide the same separating steps. For example, the regenerated solvent might be more dense than the extracted liquid salts. In this case, the positions of the bodies 61 and 63 is inverted and the electrodes 79 and 81 would be placed into the solvent body. Such changes in electric treater structure are well known.

The present invention was duplicated in a laboratory pilot plant where the basic process steps were tested in sequence to determine its ultimate feasibility. The waste water was a sour steam condensate obtained from stripping steam used to separate catalytically cracked gas-oil products, namely cat gasoline, light cycle oil and heavy cycle oil. The acidic organic material was phenols carried in the waste water. The solvent for the test purposes was a light cycle oil having an API gravity of approximately 25° API. An electrically driven two-stage centrifugal pump was employed for a mixer to intimately contact a continuous stream of the water with solvent in several volumetric ratios and temperatures. The mixing step was under such conditions of mixing energy and shear that a relatively long-life dispersion of water in the solvent was formed. The dispersion was sufficiently intense that an approximately one hour period was required in gravitational separation for 90 percent of the solvent to be released from the dispersion. After 24 hours of gravity settling, the solvent phase was yet hazy from entrained water. The resultant dispersion was passed at the mixing temperature into a first electric treater having a concentric-rod electrode wherein the energized electrode was an one inch diameter steel rod 12 inches in length and spaced three-quarters of an inch away from the cell walls formed by a steel cylinder. The rod electrode was energized with 4 kilovolts while the cell walls formed the grounded electrode. The dispersion was introduced into the electric treater at a suitable rate to provide a residence time of the solvent in the electric field of between 5 and 15 minutes. The purified water from the treater was substantially freed of phenols. The enriched solvent was taken overhead from the treater and then mixed at a 5:1 volumetric ratio with a strong caustic solution having a concentration of approximately 40 percent by weight of sodium hydroxide in water. The caustic solution was mixed intimately with the enriched solvent using an orifice mixer having a pressure drop of approximately 8 pounds to the fluid flow. The resultant dispersion had relatively a long-life considering the differences between the specific gravities of caustic solution and solvent. The dispersion would require approximately ½ hour of gravity settling to separate 90 percent of the solvent. After approximately a twelve hour gravity settling, the regenerated solvent was still hazy from entrained aqueous alkaline material. This dispersion was passed at the mixing temperature into a second treater (identical to the first treater) which produced a regenerated solvent phase containing insignificant amounts of aqueous alkaline material, a relatively pure sodium cresylate phase (liquid) and a small amount of excess caustic solution. The results of these tests in Run Numbers 1 – 5 are set forth in the following Table I.

TABLE I

| RUN NO. | 1 | 2 | 3 | 4 | 5 |

SOLVENT EXTRACTION STEPS

| | | | | | |
|---|---|---|---|---|---|
| waste water (ppm-phenols) | 1315 | 1315 | 1315 | 1315 | 1315 |
| waste water/solvent (volumetric ratio) | 1:1 | 1:1 | 1:1 | 1:2 | 1:3 |
| temperature electric Treater No. 1 | 95°F | 160°F | 210°F | 90°F | 90°F |
| enriched solvent phase (residual water phase volume %) | .001 | .001 | .001 | .001 | .001 |
| purified water (ppm-phenols) | 78 | 70 | 71 | 67 | 38 |
| percentage removal of phenols from waste water | 94% | 94% | 94% | 94% | 97% |

SOLVENT REGENERATION STEPS

| | | | | | |
|---|---|---|---|---|---|
| enriched solvent/strong caustic (volumetric ratio) | 5:1 | 5:1 | 5:1 | 5:1 | 5:1 |
| regenerated solvent phase (residual water phase volume %) | .001 | .001 | .001 | .001 | .001 |
| temperature electric treater No. 2 | amb.* | amb. | amb. | amb. | amb. |
| sodium cresylate phase** (visual test) | clear | clear | clear | clear | clear |
| caustic solution phase*** (visual text) | clear | clear | clear | clear | clear |

*Ambient Temperature, 75°–80°F
**Insignificant Amounts Residual Solvent or Caustic Solutions
***Insignificant Amounts Residual Solvent or Sodium Cresylate Phases It is apparent from the data in Table I that the present invention is a process capable of removing more than 90 percent of the phenols from the waste water. More particularly, the volumetric ratio of the water to solvent was increased from 1:1 to 1:3 volumetric ratio and correspondingly, the percent removal of the phenols increased from 94 to 97 percent. Stated in another manner, the 97 percent removal indicated a reduction of the waste water having 1315 ppm of phenol to a purified water stream having only 38 ppm of phenols. Further increases in the volumetric ratio of water to solvent could result in a reduction of the phenol content of the purified water to 10 ppm or less.

From the foregoing, it will be apparent that these has been described a process to remove acidic organic material from waste water in solvent extraction steps by using a circulating solvent in a closed system and in combination with a highly effective system comprising electric treaters for producing purified water and enriched solvent phases. In addition, steps for solvent regeneration of the enriched solvent produce directly a valuable product in the liquid salts of acidic organic material and the regenerated solvent with a recirculating stream of a slight excess of the concentrated alkali-metal hydroxide aqueous solution. Only small amounts of fresh caustic solution are ever introduced into the system to replace principally that caustic amount which is withdrawn in the salts of the extracted acidic organic material. Only a small quantity of circulating solvent need be employed relative to a high volume waste water stream in conjunction with intimate contacting for removing the acidic organic material from the waste water. Subsequently, the regeneration of the enriched solvent by a reaction induced by intimate contact with a small volume of the strong caustic solution.

Various modifications and alterations in the described process will be apparent to those skilled in the art which do not depart from the spirit of the present invention. For this reason, these changes are desired to be included within the scope of the appended claims. The appended claims define the present invention; the foregoing description is to be employed for setting forth the present invention embodiments as illustrative in nature.

What is claimed is:

1. A process for removing and concentrating acidic organic material from a water stream comprising:
   a. dispersing the water stream into an immiscible organic liquid solvent to form a first dispersion having said solvent as the continuous phase whereby said solvent removes substantial amounts of acidic organic material from said water stream;
   b. subjecting said first dispersion to an electric field for resolving said first dispersion into an enriched organic liquid solvent phase and a purified water stream phase, and separating said enriched organic liquid phase from said water stream phase;
   c. dispersing substantially stoichiometric amounts relative to the acidic organic material of an immiscible concentrated alkali metal hydroxide aqueous solution containing sufficient amounts of alkali metal hydroxide into said enriched organic liquid solvent to form a second dispersion having said solvent as the continuous phase, and said second dispersion consisting of a three phase mixture consisting of a regenerated organic liquid solvent phase, alkali metal salts of extracted acidic organic material phase and only a residue of the concentrated alkali metal hydroxide solution phase;
   d. subjecting said second dispersion to an electric field for resolving said second dispersion into a regenerated organic liquid solvent phase substantially free of acidic organic material, an alkali metal salts of extracted organic material phase, and a third phase of the residue of said concentrated alkali metal hydroxide solution, and separating said phases from one another;
   e. recycling the regenerated organic liquid solvent to step (a);
   f. passing the alkali metal salts of extracted material phase of step (d) to a subsequent utilization;
   g. recycling the residue of said concentrated alkali metal hydroxide solution to step (c) with additions of alkali metal hydroxide as needed to maintain said solution in strength sufficient to form the three phase mixture of step (c); and
   h. repeating the steps (a) through (g) in a continuous operation on the water stream.

2. The process of claim 1 wherein said concentrated alkali metal hydroxide solution is selected from the group of aqueous solutions consisting of sodium hydroxide, potassium hydroxide, and mixtures thereof, and water.

3. The process of claim 2 wherein said concentrated alkali metal hydroxide solution consists of at least 35 percent by weight of the alkali metal hydroxide.

4. The process of claim 1 wherein said organic liquid solvent is a hydrocarbon having an initial boiling point of at least 250° F.

5. The process of claim 4 wherein said organic liquid solvent is a hydrocarbon distillate having an aromatic content of at least 20 percent by volume.

6. The process of claim 1 wherein said organic liquid solvent phase has a lower density than the water stream phase in step (a).

7. The process of claim 1 wherein said alkali metal salts of extracted acidic organic material phase has a greater density than said regenerated organic liquid solvent phase and a lesser density than the residue of said concentrated alkali metal hydroxide solution phase in step (d).

8. A process for removing and concentrating acidic organic material from a water stream comprising:
   a. dispersing the water stream into an immiscible organic liquid solvent to form a first dispersion of a two phase mixture having said solvent as the continuous phase whereby said solvent removes substantial amounts of acidic organic material from said water stream;
   b. subjecting said first dispersion in a first phase separation zone to an electric field for resolving said first dispersion into a first layer comprising an enriched organic liquid solvent phase and a second layer comprising a purified water stream phase, removing said purified water phase from said first phase separation zone and transferring same to an external utilization;

c. removing said enriched organic liquid solvent phase from said first separation zone and then dispersing thereinto an immiscible concentrated alkali metal hydroxide aqueous solution containing sufficient amounts of alkali metal hydroxide to form a second dispersion of a three phase mixture having said solvent as the continuous phase, and said second dispersion consisting of a regenerated organic liquid solvent phase, an alkali metal salts of extracted organic material phase and a residue of said concentrated alkali metal hydroxide solution phase;

d. subjecting said second dispersion in a second phase separation zone to an electric field for resolving said second dispersion into a first layer comprising said regenerated organic liquid solvent phase, a second layer comprising said alkali metal salts of extracted organic material phase and a third layer comprising the residue of said concentrated alkali metal hydroxide solution phase, and transferring said second layer to an external utilization;

e. recycling said regenerated organic liquid solvent from the first layer to step (a);

f. recycling the residue of said concentrated alkali metal hydroxide solution from the third layer to step (c) with additions of alkali metal hydroxide as needed to maintain said solution in a strength sufficient to form said second dispersion comprising the three phase mixture in step (c);

g. removing said alkali metal salts of extracted material phase from second layer in step (d) and transferring same to an external utilization; and h. repeating the steps (a) through (h) on said water stream.

9. The process of claim 8 wherein said concentrated alkali metal hydroxide aqueous solution is selected from the group of aqueous solutions consisting of sodium hydroxide, potassium hydroxide, and mixtures thereof, and water.

10. The process of claim 9 wherein the concentrated alkali metal hydroxide solution consists of at least 35 percent by weight of the alkali metal hydroxide.

11. The process of claim 8 wherein the organic liquid solvent in a hydrocarbon having an initial boiling point of at least 250° F.

12. The process of claim 11 wherein the organic liquid solvent is a hydrocarbon distillate having an aromatic content of at least 20 percent by volume.

13. The process of claim 8 wherein the first layer is superimposed above the second layer in step (b).

14. The process of claim 8 wherein the first layer is superimposed above the second layer and the second layer is superimposed above the third layer in step (d).

15. The process of claim 8 wherein the acidic organic material is cresylic acids.

16. The process of claim 8 wherein the acidic organic material is predominately phenol.

* * * * *